(12) United States Patent
Sidi et al.

(10) Patent No.: US 9,747,890 B2
(45) Date of Patent: Aug. 29, 2017

(54) SYSTEM AND METHOD OF AUTOMATED EVALUATION OF TRANSCRIPTION QUALITY

(71) Applicant: Verint Systems Ltd., Herzliya Pituach (IL)

(72) Inventors: Oana Sidi, Ramat Hasharon (IL); Ron Wein, Ramat Hasharon (IL)

(73) Assignee: VERINT SYSTEMS LTD., Herzelia, Pituach (IL)

(*) Notice: Subject to any disclaimer, the term of this patent is extended or adjusted under 35 U.S.C. 154(b) by 0 days.

(21) Appl. No.: 15/180,325

(22) Filed: Jun. 13, 2016

(65) Prior Publication Data

US 2016/0365089 A1 Dec. 15, 2016

Related U.S. Application Data

(63) Continuation of application No. 14/319,853, filed on Jun. 30, 2014, now Pat. No. 9,368,106.

(60) Provisional application No. 61/860,020, filed on Jul. 30, 2013.

(51) Int. Cl.
| | |
|---|---|
| *G10L 15/00* | (2013.01) |
| *G10L 15/26* | (2006.01) |
| *G10L 17/00* | (2013.01) |
| *G10L 15/01* | (2013.01) |
| *G10L 15/04* | (2013.01) |
| *G10L 15/12* | (2006.01) |

(52) U.S. Cl.
CPC ............ *G10L 15/01* (2013.01); *G10L 15/04* (2013.01); *G10L 15/12* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 6,925,455 B2 | 8/2005 | Gong et al. | |
| 7,149,687 B1 | 12/2006 | Gorin et al. | |
| 7,487,094 B1 * | 2/2009 | Konig | G10L 15/19 379/88.01 |
| 8,543,398 B1 | 9/2013 | Strope et al. | |
| 8,554,559 B1 * | 10/2013 | Aleksic | G10L 15/30 704/235 |
| 8,571,859 B1 | 10/2013 | Aleksic et al. | |
| 8,805,684 B1 | 8/2014 | Aleksic et al. | |

(Continued)

OTHER PUBLICATIONS

Levenshtein, V.I., "Binary Codes Capable of Correcting Deletions, Insertions, and Reversals," Soviet Physics-Doklady, vol. 10, No. 8, 1966, pp. 707-710.

(Continued)

*Primary Examiner* — Satwant Singh
(74) *Attorney, Agent, or Firm* — Meunier Carlin & Curfman

(57) ABSTRACT

Systems and methods automatedly evaluate a transcription quality. Audio data is obtained. The audio data is segmented into a plurality of utterances with a voice activity detector operating on a computer processor. The plurality of utterances are transcribed into at least one word lattice with a large vocabulary continuous speech recognition system operating on the processor. A minimum Bayes risk decoder is applied to the at least one word lattice to create at least one confusion network. At least conformity ratio is calculated from the at least one confusion network.

14 Claims, 3 Drawing Sheets

(56) References Cited

U.S. PATENT DOCUMENTS

| | | | |
|---|---|---|---|
| 8,880,398 B1 | 11/2014 | Aleksic et al. | |
| 9,123,333 B2* | 9/2015 | Amarilli et al. | |
| 9,202,461 B2* | 12/2015 | Biadsy | G10L 15/063 |
| 9,460,722 B2* | 10/2016 | Sidi | G10L 17/16 |
| 9,503,579 B2* | 11/2016 | Zhang | H04M 3/5175 |
| 9,508,346 B2* | 11/2016 | Achituv | G06F 17/30746 |
| 2003/0055640 A1* | 3/2003 | Burshtein | G06K 9/6297 704/235 |
| 2014/0142940 A1 | 5/2014 | Ziv et al. | |
| 2014/0142944 A1 | 5/2014 | Ziv et al. | |
| 2014/0222419 A1 | 8/2014 | Romano et al. | |
| 2014/0222476 A1 | 8/2014 | Romano | |
| 2015/0025887 A1 | 1/2015 | Sidi et al. | |
| 2015/0066502 A1 | 3/2015 | Achituv et al. | |
| 2015/0066503 A1 | 3/2015 | Achituv et al. | |
| 2016/0217792 A1* | 7/2016 | Gorodetski | G10L 17/04 |
| 2016/0217793 A1* | 7/2016 | Gorodetski | G10L 17/04 |
| 2017/0053653 A1* | 2/2017 | Sidi | G10L 17/02 |

OTHER PUBLICATIONS

Viterbi, A.J., "Error Bounds for Convolutional Codes and an Asymptotically Optimum Decoding Algorithm," IEEE Transactions on Information Theory, vol. 13, No. 2, 1967, pp. 260-269.

Xu, H., et al., "Minimum Bayes Risk decoding and system combination based on a recursion for edit distance," Computer Speech & Language, vol. 25, Issue 4, 2011, pp. 802-828.

\* cited by examiner

SYSTEM AND METHOD OF AUTOMATED EVALUATION OF TRANSCRIPTION QUALITY

CROSS-REFERENCE TO RELATED APPLICATION

The present application is a continuation of U.S. patent application Ser. No. 14/319,853, which issues as U.S. Pat. No. 9,368,106 on Jun. 14, 2016, which claims priority of U.S. Provisional Patent Application No. 61/860,020, filed on Jul. 30, 2013, the disclosures of which are all hereby incorporated herein by reference in their entireties.

BACKGROUND

Evaluation of the quality of a transcription of audio data produced using automated techniques eventually relies on comparison to manual transcription. Speech-recognition systems can be evaluated using a set of manually transcribed utterances. These manually transcribed utterances serve as the basis upon which the evaluation is made. An automated transcription output of a speech recognition system, yields a word sequence for each utterance in the audio data. These automated transcriptions of the utterances are aligned to the manual transcriptions of the same utterances. This may be performed using Levenshtein's algorithm, disclosed at Levenshtein V. I. "Binary codes capable of correcting deletions, insertions, and reversals". Soviet Physics Doklady 10: 707-710 (1966) which is hereby incorporated by reference in its entirety. After the automated and manual transcriptions are aligned, the number of correct words, incorrect words, and/or substitutions can be counted. A number of inserted words and/or deleted words in the automated transcription can also be computed with respect to the manual transcription. These figures are used to compute measures like the word error rate (WER), or the precision and recall (P/R) of the transcription systems.

BRIEF DISCLOSURE

In an exemplary embodiment of a method of automated evaluation of a transcription quality, audio data is obtained. New audio data is segmented into a plurality of utterances with a voice activity detector that operates on a computer processor. The plurality of utterances are transcribed into at least one word lattice with a large vocabulary continuous speech recognition system operating on the processor. A minimum base risk decoder is applied, with a process, to the at least one word lattice to create at least one confusion network. The at least one confusion network represents the at least one word lattice as a plurality of sequential burdens and epsilon-bins. At least one conformity ratio is calculated from the at least confusion network.

An exemplary of a system, of automated evaluation and transcription quality includes an audio data source upon which a plurality of audio data filed stored. A processor received the plurality of audio data files. The processor segments the audio data files into plurality of utterances. The processor applies at least one transcription model to the plurality of utterances to transcribe the plurality of utterances into a word lattice. A non-transient computer readable medium is communicatively connected to the processor and programmed with computer readable code. When the computer readable code is executed by the processor it causes the processor to apply a minimum base risk decoder to the at least one word lattice to create at least one confusion network that represents the at least one word lattice as a plurality of sequential word bins and epsilon-bins. The processor further calculated at least one conformity ratio from the at least one confusion network. The processor further calculates a transcription quality score from the at least one conformity ratio.

An exemplary embodiment of a non-transient computer readable medium programmed with computer readable code scores a transcription quality. Upon execution of the computer readable code by the processor, the processor obtains audio data. The processor further segments the audio data into a plurality of utterances with a voice activity detector. The processor transcribes the plurality of utterances into at least one word lattice with a large vocabulary continuous speech recognition system. The processor applies a minimum base risk decoder to the at least one word lattice to create at one confusion network. The at least one confusion network represents the at least one word lattice as a plurality of sequential word bins and epsilon-bins. At least one conformity ratio is calculated by the processor from the at least one confusion network. A transcription quality score is calculated by the processor from the at least one conformity ratio. In indication of the transcription quality score is provided.

DETAILED DISCLOSURE

Large vocabulary continuous speech-recognition (LVCSR) systems, examples are which are disclosed herein, are operable to produce an automated transcription of audio data. In order for the LVCSR system to be useful, it is important to be able to estimate the accuracy of the transcriptions produced by the system. The system accuracy can depend upon several parameters, including, but not limited to audio quality, quality of the acoustic model (and how well the acoustic model fits the actual acoustic environment), quality of the linguistic model (and how well the linguistic model fits the actual spoken utterances), and recognition parameters.

In embodiments, it may be desirable to estimate the accuracy of transcriptions produced by LVCSR system either before or after the LVCSR system is in use. In an embodiment, it is desirable to prove or confirm that an LVCSR system produces accurate transcriptions of expected audio data. In other embodiments it is desirable to confirm that an LVCSR system in use produces transcriptions that are accurate to the audio data actually received. LVCSR systems may transcribe thousands of recorded audio events per day. In embodiments, it may be desirable to detect changes in the transcription quality. Detection of changes in transcription quality can enable identification of causes for such changes (e.g. degradation in the audio quality or the deployment of a faulty acoustic or linguistic model) and respond to the changes, exemplarily to take corrective actions.

While the standard WER and RJR measurements as described above can prove useful for estimating, recognition accuracy in a lab, or a controlled setting. These techniques are difficult to effectively implement in the field, as there are either no manual transcriptions for the processed conversation(s), or very few manual transcriptions due to the cost to obtain them. As disclosed in further detail herein, systems and method can produce automated evaluations of transcription quality from an automated transcription system such as an LVCSR system manual transcription and therefore may be used in new settings in which manual transcription is not practical, for example due to transcription volume.

Figure 1:
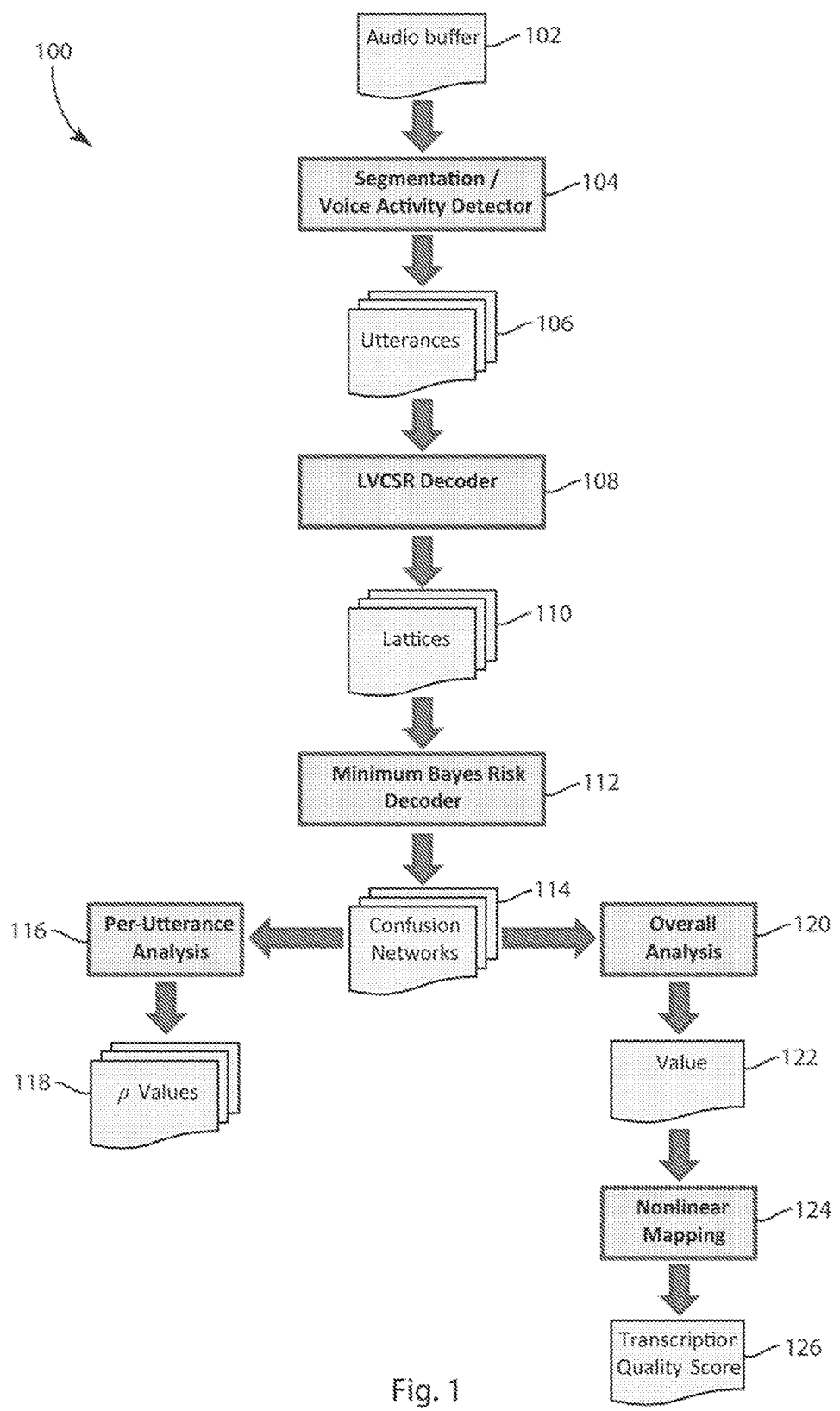
FIG. 1 is a flowchart that depicts an exemplary embodiment of a method of automated evaluation of transcription quality.
Figure 2:
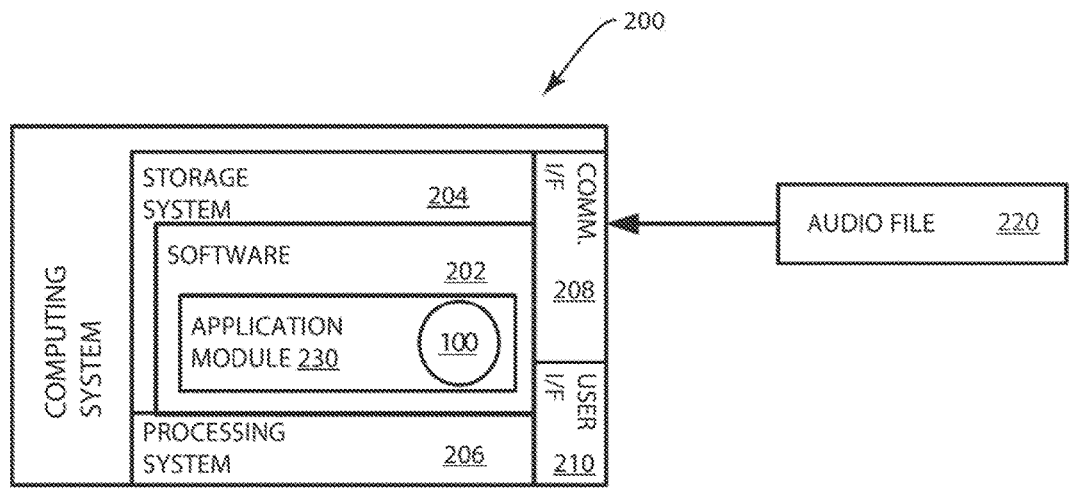
FIG. 2 is a system diagram of an exemplary embodiment of a system for automated evaluation of transcription quality.

FIG. 1 is a flow chart that depicts an exemplary embodiment of a method 100 of automated evaluation of transcription quality. FIG. 2 is a system diagram of an exemplary embodiment of a system 200 for automated evaluation of transcription quality. The system 200 is generally a computing system that includes a processing, system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can comprise a microprocessor and other circuitry that retrieves and executes software 202 from storage system 204. Processing system 206 can be implemented within a single processing device but can also be distributed across multiple processing devices or sub-systems that cooperate in executing program instructions. Examples of processing system 206 include general purpose central processing units, application specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interlace 210.

As described in further detail herein, the computing system 200 receives an audio file 220. The audio file 220 may be an audio recording or a conversation, which may exemplarily be between two speakers, although the audio recording may be any of a variety of other audio records, including multiples speakers, a single speaker, or an automated or recorded auditory message. The audio file may exemplarily be a .WAV file, but may also be other types of audio files, exemplarily in a post code modulation (PCM) format and an example may include linear pulse code modulated (LPCM) audio filed. Furthermore, the audio file is exemplary a mono audio file; however, it is recognized that embodiments of the method as disclosed herein may also be used with stereo audio files. In still further embodiments, the audio file may be streaming audio data received in real time or neat-real time by the computing system 200.

In an embodiment wherein the audio file 220 is streaming audio data, the method 100 begins with an audio buffer 102 that receives and processes the streaming audio data. In embodiments, wherein the audio data has been previously acquired and stored, this step may be optional, and embodiments may begin 104 instead. At 104 received audio data (whether streaming, real-time, previously stored, or otherwise) is segmented, exemplarily with a voice activity detector (VAD). A VAD may be a software module or subroutine stored on the storage system 204 and executed by the computer processor 206. The VAD segments the audio file into utterances or frames. In merely exemplary embodiment, a 20-25 millisecond frame of audio is processed every 10 milliseconds. Such speech frames are long enough to perform meaningful spectral analysis in relation to the temporal characteristics of the speech signal, yet they are short enough to give fine granularity to the output. The frames are grouped into utterances separated by non-speech segments in the audio file. Non-speech segments in the audio file can be identified by an evaluation of the energy envelope of each of the frames to segment the audio data into a plurality of utterances at 106. Utterances are segments of speech that are highly likely to have emanated from a single speaker, at least in part due to the bounds by non-speech segments.

The plurality of utterances are provided to an LVCSR decoder at 108. The LVCSR decoder operates to transcribe each of the plurality of utterances. In exemplary embodiment, the LVCSR decoder can operate by applying one or more acoustic or linguistic models to the audio data segmented into utterances to produce one or more transcriptions as described in further detail herein. In an exemplary and non-limiting embodiment, and acoustic model may exemplarily be one developed to identify words spoken in a particular language, or dialect. In an additional exemplary embodiment, an acoustic model may result from analysis of a large number of calls in which a particular individual, or individuals are participating and a linguistic model may be adapted to specifically identify the speech of these individuals, in exemplary and non-limiting embodiments of linguistic models, a linguistic model may be developed for words that are commonly used in a field or industry in which the LVCSR decoder is used. One non-limiting example may be a linguistic, model developed for customer service interactions, while another linguistic model will allow for transcription of technical or scientific audio data. In a still further and non-limiting embodiment, a linguistic model may include one or more scripts or commonly spoken phrases or combinations of words that are expected to appear together due to the context of the implementation of the LVCSR decoder.

In such embodiment, the LVCSR decoder receives one or more language and/or acoustic models for use in the LVCSR transcription at 108. In an exemplary embodiment, the received one or more language and/or acoustic model may be a compiled model, compiled from various source models, including but not limited to acoustic, language, dictionary, and grammar models. In exemplary embodiments as disclosed herein, the language and/or acoustic model may be a generalized representation of the distribution of phonemes, words, word pairs, word triplets, or other phrases in speech while in other embodiments, the language and/or acoustic model may be specialized for distribution of phonemes, words, and terms in a specific industry, technical, or scientific field, or specific to a language or a dialect, or expected in the received audio data.

Figure 3:
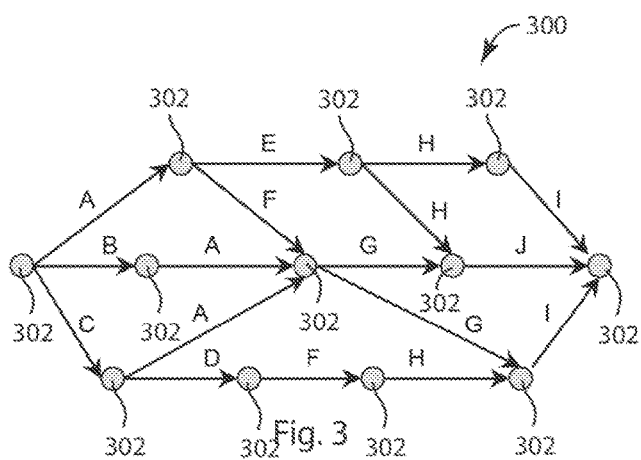
FIG. 3 depicts an exemplary embodiment of a word lattice output from an automated transcription.

Given an input that represents a spoken utterance, the simplest output format from an LVCSR decoder at 108 is a sequence of recognized words, along with word boundaries. For example, the start and end time-stamp of each output word can be determined. These start and end time stamps represent the word boundaries. In a non-limiting embodiment, this may be performed using the Viterbi algorithm as described in Viterbi A. J., "Error bounds for convolutional codes and an asymptotically optimum decoding algorithm". *IEEE Transactions on Information Theory* 13(2): 260-269 (1967), which is hereby incorporated, by reference in its entirety. However, in recognition of the complexity and uncertainty in the outputs, an alternative output format that represents various possible output words is desirable. In an embodiment disclosed herein, the Viterbi algorithm as used by the LVCSR engine is modified such that it outputs a plurality of word lattices at 110. A word lattice is a weighted and directed graph whose nodes are associated with time stamps and whose arcs are labeled with output words, where the weight of each arc is the log-likelihood of the corresponding word. FIG. 3 depicts a non-limiting exemplary embodiment of a word lattice 300 exemplarily output at 110. The positions of the nodes 302 represent the order of those nodes 302 along the time axis. Each of the letters (A-I) represent words in the possible transcription.

While the lattice output at 110 may be used for representing alternative outputs in a manner that minimizes sentence error rate (or error rate within an utterance), the lattice can be converted to an alternative format that rather minimizes the word error rate of the LVCSR output at 108. By converting the lattice to a confusion network, the word error rate can be minimized. The word lattice can be exemplarily converted to a confusion network using a minimum Bayes risk decoder at 112. There are several methods for converting a lattice to a confusion network. One embodiment of which is described by Xu H., Povey D., Mangu L., Zhu J. "Minimum Bayes Risk decoding and system combination based on a recursion for edit distance," Computer Speech & Language 25(4): 802-828 (2011), which is hereby incorporated by reference in its entirety. In such an embodiment, the word sequence is extracted along the best path in the lattice. This path is padded with epsilon symbols (e.g. the path becomes $\epsilon_1$, $W_1$, $\epsilon_1$, $W_2$, $\epsilon$ ... $W_N$, $\epsilon$). The path is recursively aligned with the rest of lattice paths. This results in a confusion network at 114 that contains 2n+1 bins, denoted $B_0$, B, ..., $B_{2n}$, where the most probable arcs of the bins with odd indices (namely $B_1$, $B_3$ ...) are labeled with non-epsilon arcs, and the most probable arcs of the bins with even indices (namely $B_0$, $B_2$ ...) have $\epsilon$-labels; we refer to these bins as $\epsilon$-bins.

Figure 4:
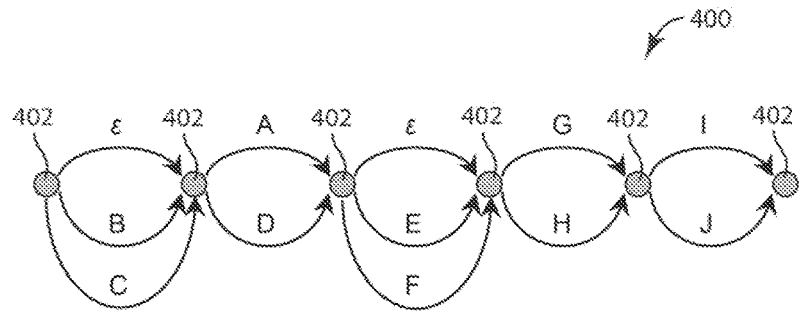
FIG. 4 depicts an exemplary embodiment of a confusion network derived from at least one word lattice.

FIG. 4 depicts a non-limiting exemplary embodiment of a confusion network 400 constructed exemplarily from the word lattice 300 depicted in FIG. 3. A confusion network is a linear sequence of nodes 402, which are associated with average time-stamps, such that a confusion-network arc may only connect two consecutive nodes 402. For this reason, the network arcs can be grouped into bins, where the arcs of a single bin represent the various word alternatives for the relevant time segment. The confusion-network arcs are weighted by probability values, where the probabilities of the arcs over a single bin sum up to 1. The confusion network may further be thought of as the weighted average of all word alternatives encoded in the lattice. To make this averaging possible, it is necessary to allow $\epsilon$-labels in the confusion network, namely to allow for arcs that are not associated with output words.

It is possible to estimate the overall accuracy of the LVCSR output from the confusion-network probabilities. In an example wherein both acoustic and linguistic models used in the LVCSR are a good fit, the majority of the word bins contain a single word whose probability is high (close to 1), and their adjacent $\epsilon$-bins contain only a single arc with $\epsilon$-label, which naturally has probability of 1. On the other hand, in an example wherein the audio has poor conformity to the acoustic model, or the spoken utterances have poor conformity to the language model, the LVCSR output becomes more uncertain, and the confusion network will contain more alternatives. As the result becomes more uncertain, the expected probability of the most probable word in the word bins will be smaller and, the probability of non-epsilon arcs in the $\epsilon$-bins increases.

The LVCSR output can be evaluated on a per-utterance basis at 116 or to provide on overall analysis of the transcription at 120. Exemplarily as described with respect to 118, a plurality of ρ values representative of the quality of a per-utterance conformity can be calculated as described herein. A quality score representative of the quality of the conformity of the LVCSR models to the audio data can be derived based on the above-noted characteristics of the confusion network. Given a confusion network, let $p_k$ be the probability of the most probable arc in the kth bin. In computing ρ, the joint probability of each $\epsilon$-bin and the word bin that precedes it are considered. The following ration can be used to compute ρ:

$$\rho = \frac{1}{n} \cdot \sum_{j=1}^{n} p_{2j-1} \cdot p_{2j}$$

Figure 5:
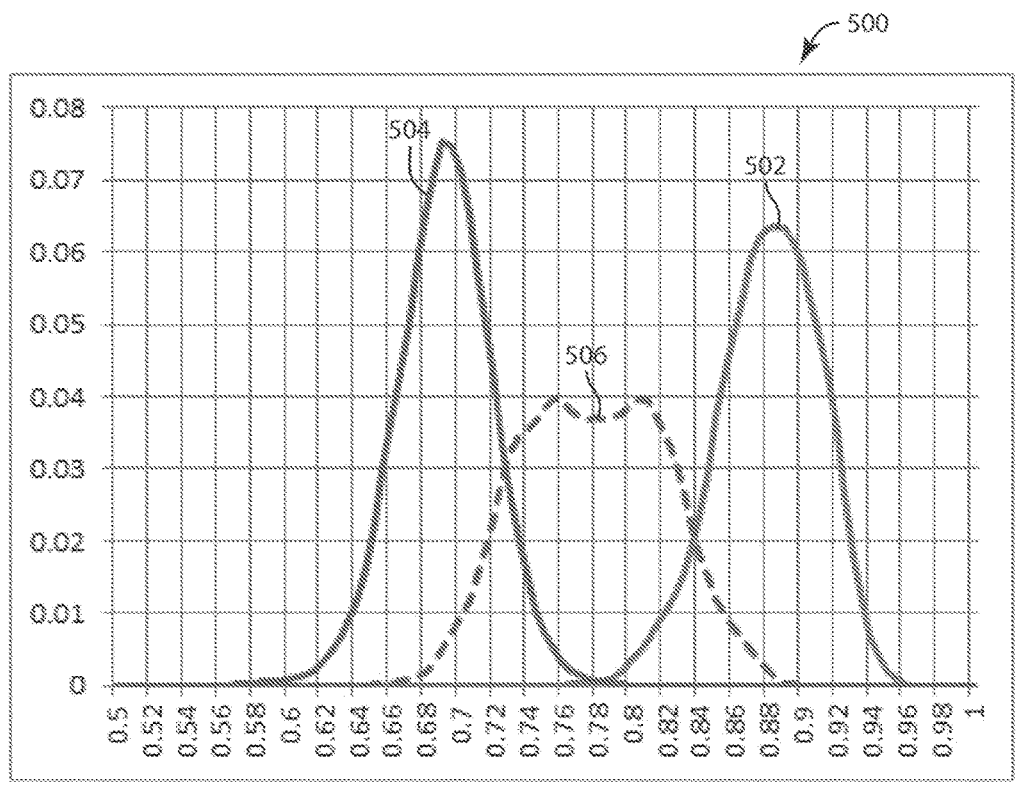
FIG. 5 depicts a graph of exemplary utterance conformities when transcribed with different models.

This value of ρ can clearly separate cases where there is a good conformity to the LVCSR models and cases where the conformity is poor. FIG. 5 depicts a graph 500 of exemplary distributions of utterance conformity with different LVCSR models. To produce a graph 500, an exemplary set of a few thousand of utterances in different languages were each transcribed with a conforming model (e.g. a model selected to acoustically and linguistically match the utterances). The same set of utterances were also transcribed using a mismatched model (e.g. an English utterance transcribed using a Spanish model), or a partially mismatched model (e.g. using different dialects of the same language, or using a linguistic model mismatched in subject matter). The distribution of ρ for each of these scenarios is shown in the graph 500 in FIG. 5, Graph 502 denotes the distribution of ρ for the conforming model transcriptions. Graph 504 denotes the distribution of ρ for the mismatched model. Graph 506 denotes the distribution of ρ for the partially mismatched model.

Given a transcribed conversion comprised of several utterances, it is possible to compute the conformity ratio ρ per utterance at 118 in the manner as described above. This conformity ratio per utterance can exemplarily be used for a variety of purposes. In an embodiment, the conformity ratio ρ can be used as an automated indication of transcription quality. Transcriptions of individual utterances, utterances of a particular speaker, or other parts of the audio data can be identified if these exhibit an abnormally low conformity. These utterance transcriptions may be problematic as the accuracy of the transcription may be called into question. Additionally, a low conformity ratio may indicate audio data that had been identified as an utterance by the VAD, but are actually non-speech parts of the audio data Exemplarily background noises or non-speech vocal noises (such as laughter, stammer, etc.) may be classified as speech utterances by the voice activity detector. These utterances will be transcribed a low ρ value and once identified as such can be easily distinguished from other speech utterances that have a higher ρ value. In another embodiment, transcribed conversations of high quality can be identified and selected and/or stored to be used in an automated model adaptation process(es). Well transcribed calls can be identified and selected and/or stored so that the underlying, or source, utterance can be used in the creation of an acoustic signature for a specific speaker in audio data. Identified high quality transcriptions can similarity be used to select utterances create speaker-specific adaptations of an acoustic model.

Starting at 120, the confusion network from 114 can be used to perform an overall analysis of a transcription. Given a confusion network that represents the LVCSR output for a specific speech utterance, it is possible to compute the value of ρ in order to evaluate the quality of the overall transcription. Moreover, in an embodiment wherein the audio data includes a sequence of M utterances is transcribed, the averages ρ over all utterances can be computed at 122. Let $n^{(i)}$ be the number of words in the best path of the ith utterance and let $p_k^{(i)}$ be the probability of the best alternative in the kth bin of the confusion matrix for this utterance, the equation becomes:

$$\hat{\rho} = \frac{\sum_{i=1}^{M} \sum_{j=1}^{n^{(i)}} p_{2j-1}^{(i)} \cdot p_{2j}^{(i)}}{\sum_{i=1}^{M} n^{(i)}}$$

Depending upon the conformity of the one or more models to the audio data, the distribution of $\hat{\rho}$ may generally appear as depicted in FIG. 5 and as described above, it is possible to map at 124 either value to a transcription quality score, which is exemplarily a number between 0 and 100. The transcription quality score gives an initial evaluation for the LVSCR accuracy for the audio data, without actually requiring a manual transcription serving as the comparison basis. To this end, a non-linear mapping of ρ or $\hat{\rho}$ can be used, exemplarily a sigmoid:

$$S(x) = \left[ 100 \cdot \frac{1}{1 + e^{-\sigma \cdot (x-\mu)}} \right]$$

Figure 6:
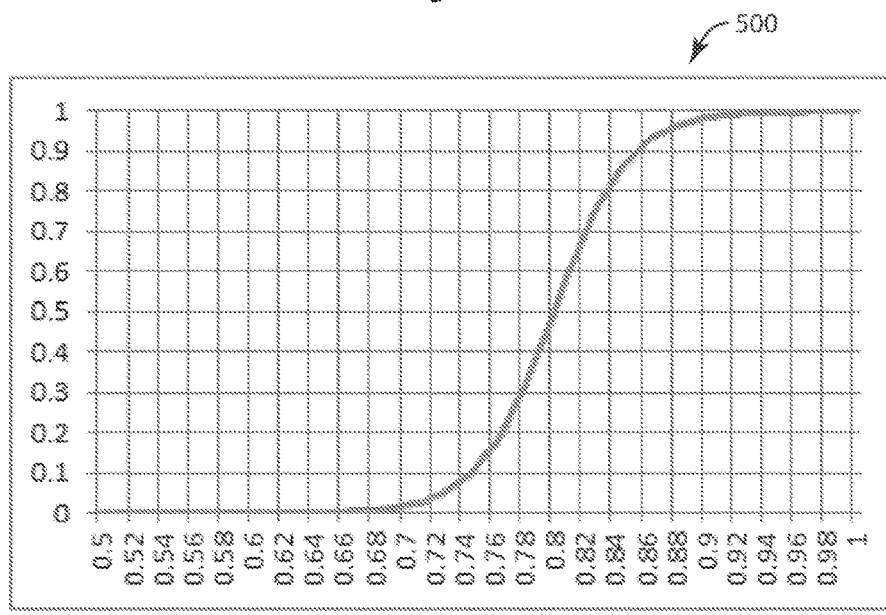
FIG. 6 depicts an exemplary graph of transcription quality as a function of utterance conformity.

For example, selecting μ=0.8 and σ=40 exemplarily provides a mapping to the exemplary range of 0-100, or in the case as depicted in FIG. 6, 0-1. This transcription quality score determined at 126 can be used as a representation of the quality of the transcription. This is exemplarily depicted in graph 600 shown in FIG. 6. With reference to the exemplary ρ or $\hat{\rho}$ distributions depicted in graph 500 of FIG. 5 and the normalized curve 600 of FIG. 6, the sigmoid normalization enables the separation and distinction in the resulting transcription quality score generally between the ρ or $\hat{\rho}$ values of well-matched models and the ρ or $\hat{\rho}$ values of mismatched models. In FIG. 5, matched models generally have ρ≥0.84 and in mismatched models ρ≤0.73. translated to a transcription quality score as shown in FIG. 6, matched models have a transcription quality score between 0.8-1 and in mismatched models have a transcription quality score batwing 0-0.08

By analyzing a large number of conversations, the quality score computed at 126 per conversation may be used for a variety of purposes. Audio data in a different or unexpected language can be identified due to a poor acoustic and/or linguistic match. Audio data regarding a subject unrelated to an expected subject can be identified due to a poor linguistic match. Conversations with poor transcriptions can be separated from a corpus of transcriptions which may be subsequently used in automated learning, processes to create one or more new models. The poor quality transcriptions can thus be removed from consideration, for example in constructing acoustic or linguistic models. A histogram of the quality scores across a plurality of transcriptions can be created. Changes in the histogram can be identified and/or tracked. In an embodiment, this can enable an alert of a sudden or a gradual degradation of the overall transcription quality in a deployed, transcription system. These indications can provide a warning for the need for software updates or other system maintenance. Scenarios in which an acoustic and/or a linguistic adaptation are needed can be identified.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the an will understand and appreciate that a methodology can alternatively be represented as a series of interrelated states or events, such as in a state diagram.

Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended, to be within the scope of the claims if they have structural elements that do not differ from the literal language of the claims, or if they include equivalent structural elements with insubstantial differences from the literal languages of the claims.

What is claimed is:

1. A method of automated evaluation of a transcription quality, the method comprising:
    obtaining audio data;
    segmenting the audio data into a plurality of utterances with a voice activity detector operating on a computer processor;
    transcribing the plurality of utterances into at least one word lattice with a large vocabulary continuous speech recognition system operating on the processor, wherein each of the plurality of utterances is transcribed by the processor into a respective word lattice;
    applying, by the processor, a minimum Bayes risk decoder to the at least one word lattice to create at least one confusion network representing the at least one word lattice as a plurality sequential word bins and $\epsilon$-bins, wherein the processor creates a confusion network for each word lattice; and
    calculating, with the processor, at least one conformity ratio from the least one confusion network, wherein the processor calculates a conformity ratio for each confusion network;
    calculating, with the processor, a transcription quality score from the at least one conformity ratio;
    filtering, by the processor, the plurality confusion networks based upon the calculated transcription plurality score of each confusion network;
    selecting, by the processor, those confusion networks from the plurality of confusion networks having a transcription quality score greater than a predetermined value; and
    storing, by the processor, the selected confusion networks as a plurality of high quality transcriptions.

2. The method of claim 1, wherein the audio data is streaming audio data.

3. The method of claim 1, wherein calculating the conformity ration for each confusion network further comprises:
    identifying a probability value of a most probable word arc in each word bin; and
    calculating a joint probability for each $\epsilon$-bin and a preceding word bin;
    wherein the conformity ratio is an average of the calculated joint probabilities for the confusion network.

4. The method of claim 1, wherein the transcription quality score is a normalized value of the conformity ratio.

5. The method of claim 1, further comprising calculating an overall conformity ratio for a transcription of the audio data from the conformity ratios calculated from the confusion network of each of the utterances in the plurality of utterances.

6. The method of claim 1, further comprising creating a transcription model by analyzing the plurality of high quality transcriptions.

7. The method of claim 1, further comprising:
    obtaining the utterances associated with each of the confusion networks in the plurality of high quality transcriptions; and
    creating a transcription model based upon the obtained utterances.

8. The method of claim 1, further comprising producing an indication of the of the transcription quality score.

9. The method of claim 1, wherein transcribing the plurality of utterances comprises applying at least one transcription model to each of the plurality of utterances and wherein the at least one conformity ratio is indicative of a conformity between the audio data and the at least one transcription model.

10. The method of claim 9, further comprising: selecting a new at least one transcription model based upon the at least one conformity ratio; and transcribing the plurality of utterances by applying the new at least one transcription model to each of the plurality of utterances.

11. A system for automated evaluation of transcription quality, the system comprising:
    an audio data source upon which a plurality of audio data files are stored;
    a processor that receives the plurality of audio data files, segments the audio data files into a plurality of utterances and applies at least one transcription model to the plurality of utterances to transcribe the plurality of utterances into at least one word lattice, wherein each of the plurality of utterances are transcribed into a respective word lattice;
    a non-transient computer readable medium communicatively connected to the processor and programmed with computer readable code that when executed by the processor causes the processor to:
        apply a minimum Bayes risk decoder to the at least one word lattice to create at least one confusion network representing the at least one word lattice as a plurality of sequential word bins and $\epsilon$-bins, wherein a confusion network is created for each word lattice;
        calculate at least one conformity ratio from the at least one confusion network, wherein a conformity ratio is calculated for each confusion network;
        calculate a transcription quality score from the at least one conformity ratio
        filter the plurality confusion networks based upon the calculated transcription quality score of each confusion network;
        select those confusion networks from the plurality of confusion networks having a transcription quality score greater than a predetermined value; and
        store the selected confusion networks as a plurality of high quality transcriptions.

12. A non-transient computer readable medium programmed with computer readable code that upon execution by as processor causes the processor to:
    obtain audio data;
    segment the audio data into a plurality of utterances with a voice activity detector;
    transcribe the plurality of utterances into at least one word lattice with a large vocabulary continuous speech recognition system, each of the plurality of utterances being transcribed into a respective word lattice;
    apply a minimum Bayes risk decoder to the at least one word lattice to create at least one confusion network representing the at least one word lattice as a plurality of sequential word bins and $\epsilon$-bins, wherein a confusion network is created for each word lattice;

calculate at least one conformity ratio from the at least one confusion network, wherein a conformity ratio is calculated for each confusion network;
calculate a transcription quality score from the at least one conformity ratio;
filter the plurality confusion networks based upon the calculated transcription quality score of each confusion network;
select those confusion networks from the plurality of confusion networks having a transcription quality score greater than a predetermined value; and
store the selected confusion networks as a plurality of high quality transcriptions.

13. The non-transient computer readable medium of claim 12, wherein execution of the computer readably code by the processor further causes the processor to:
identify a probability value of a most probable word arc in each word bin; and
calculate a joint probability for each $\epsilon$-bin and a preceding word bin;
wherein the conformity ratio is an average of the calculated joint probabilities for the confusion network.

14. The non-transient computer readable medium of claim 13, wherein at least one transcription model is applied to the plurality of utterances to transcribe the plurality of utterances and wherein the at least one conformity ratio is indicative of a conformity between the audio data and the at least one transcription model.

* * * * *